(12) United States Patent
Carrillo

(10) Patent No.: US 6,396,162 B1
(45) Date of Patent: May 28, 2002

(54) UNDERGROUND HYDROELECTRIC PLANT

(75) Inventor: David Matthew Carrillo, Riverside, CA (US)

(73) Assignee: David Matthew Carrillo, Escondido, CA (US)

( * ) Notice: Subject to any disclaimer, the term of this patent is extended or adjusted under 35 U.S.C. 154(b) by 59 days.

(21) Appl. No.: 09/695,731

(22) Filed: Oct. 24, 2000

(51) Int. Cl.⁷ .................................................. H02P 9/04
(52) U.S. Cl. ........................................... 290/43; 290/54
(58) Field of Search ........................... 290/43, 42, 1 R

(56) References Cited

U.S. PATENT DOCUMENTS

| | | | | |
|---|---|---|---|---|
| 4,053,787 A | * | 10/1977 | Diggs | 290/43 |
| 4,132,901 A | * | 1/1979 | Crausbay | 290/42 |
| 4,475,334 A | * | 10/1984 | Kuwabara | 290/43 |
| 4,674,279 A | * | 6/1987 | Ali et al. | 290/43 |
| 4,794,544 A | * | 12/1988 | Albright et al. | 290/43 |
| 4,965,998 A | * | 10/1990 | Estigoy et al. | 290/43 |
| 5,389,821 A | * | 2/1995 | Moulliet | 290/1 R |

FOREIGN PATENT DOCUMENTS

| | | | | |
|---|---|---|---|---|
| JP | 09310329 A | * | 12/1997 | |
| JP | 2000009013 A | * | 1/2000 | |
| JP | 2000009015 A | * | 1/2000 | |
| JP | 2000282446 A | * | 10/2000 | |
| WO | WO 9728367 A1 | * | 8/1997 | F03B/13/08 |

* cited by examiner

Primary Examiner—Joseph Waks

(57) ABSTRACT

An underground hydroelectric power plant for use adjacent to rivers, which utilizes an underground water tank connected to multiple underground penstocks. The said penstocks will carry water to underground turbines, which will operate generators for the generation of electricity. This electric energy will be transferred via underground cables to an offsite transformer. The water upon exiting the turbines will be led via an underground outlet pipe back to the river. This underground hydroelectric plant operates on the simple principle that a flowing body of water in a river must have a downward angle to it or the water would not flow and be stagnant, similar to a lake.

4 Claims, 4 Drawing Sheets

UNDERGROUND HYDROELECTRIC PLANT

BACKGROUND OF THE INVENTION

The present invention relates directly to hydroelectric power generation, in particular to a hydroelectric power generating plant that solves many of the limitations and problems seen with today's dam system.

The use of dams for the production of electrical energy has six major problems. First, the building of a dam on various scenic rivers has been met with much opposition from both ecologists and the general public. Ecologists do not approve with the alteration of the natural habitats of the river dwelling species and organisms, and the general public does not approve that the natural flow of the river is being altered. Second, the building of dam along a river floods potentially useful cropland, rendering the land useless except for recreation purposes. Third, dams can only be built along rivers where nature makes it feasibly possible. Ergo, this limits the number of dam operated hydroelectric plants that can be built and utilized. Fourth, the accumulation of silt behind dams forces either the dredging of the silt or the destruction of the dam—both of which are very costly procedures. Fifth, with the construction of a dam operated hydroelectric plant, fish species, which migrate down the river, are typically injured as they travel through the turbine of the plant. Conversely, fish migrating up river are absolutely inhibited of doing so by the dam's interference.

Finally, dam operated hydroelectric plants cannot be built on rivers that freeze over.

With the present invention these problems will cease to exist. In fact, to the normal observer, the actual existence of the proposed hydroelectric plant will appear to be an enigma.

SUMMARY OF THE INVENTION

The inventor has designed a unique hydroelectric system, which still utilizes the potential energy of falling water to produce electrical energy, but does so using an underground facility. In a dam operated hydroelectric plant a reservoir of water is utilized to ensure a constant flow of water through the turbines of the hydroelectric plant during drought or flood conditions. The present design makes use of the dam obsolete. Rather than storing water using a dam, an underground storage tank, beginning about six feet underground, will be utilized. This storage tank will potentially hold the same amount of water as a typical dam operated hydroelectric plant. An inlet pipe intersecting the river at its midpoint of depth, with the opening covered with a grate to keep fish out, would supply the underground tank with water. To keep the supply of water constant in the tank, a water level sensor will control the flow valve between the inlet pipe and the tank.

Connected at the base of the water tank will be a series of pipes, each controlled by a separate flow valve. Each pipe will lead to a turbine. By having multiple pipes from the storage tank lead to multiple turbines, this design allows for absolute control of the electrical output of the plant. These turbines would thus cause generators to turn, which could then send their electrical energy via underground cables to transformers about I mile away from the river. The water exiting the turbines would follow an underground outlet channel leading back to the river. The outlet pipe would intersect the river at its surface allowing water from the outlet pipe to rejoin the river water on its downward path. A simple mesh/grated covering over the outlet pipe would ensure that fish could not enter.

This entire design depends on the river having a slight downward angle relative to the horizontal. If a river had no downward angle to it, the water would be stagnant and be a lake. As each river has a different downward angle to it, this makes the downward angle needed for the outlet pipe variable. However, as long as the downward angle of the outlet is slightly less than that of the rivers', the outlet will always meet up with the river. Also, the increased momentum the water gains by falling and thus traveling through the turbines will also aid in the water from the plant flowing from the outlet to the river.

This proposed underground hydroelectric plant solves many of the problems with the modern dam operated hydroelectric plant. First, it gets rid of the dam, which disturbed the natural flow of water. Second, cropland adjacent to a river will no longer be flooded. Third, planners of hydroelectric plants will no longer need to find a physically feasible location to erect a dam operated hydroelectric plant. Fourth, dredging and destruction of dams because of silt build up will no longer be a problem. Fifth, the migration of fish both up and down stream will no longer be inhibited because of the grate on the inlet pipe and the mesh on the of the outlet pipe. Finally, rivers that freeze over can now be utilized for the production of electrical energy.

This proposed invention also has many positive side effects. First, by having underground wires connecting the underground generators to above ground transformers located about a mile from the river, no one will even know the hydroelectric plant is there. Second this design allows for plants to be built continuously down the river, one right after another, so that every section of the river could be utilized. Finally, this design allows the entire system to be cleaned of silt by simply flushing the system out.

The two major advantages to this system are that it is pollution free and it makes more efficient use of rivers to make electricity. With the increase in efficiency of rivers to make electricity, the hope is to lower the use of coal burning, natural gas burning, and nuclear fission to generate electricity, all three of which pollute the earth and are non-renewable resources. With an increase in the use of hydroelectricity, many of the earth's limited natural resources can be preserved and could potentially put the brakes on both air and ground pollution.

DETAILED DESCRIPTION OF THE INVENTION

Figure 1:
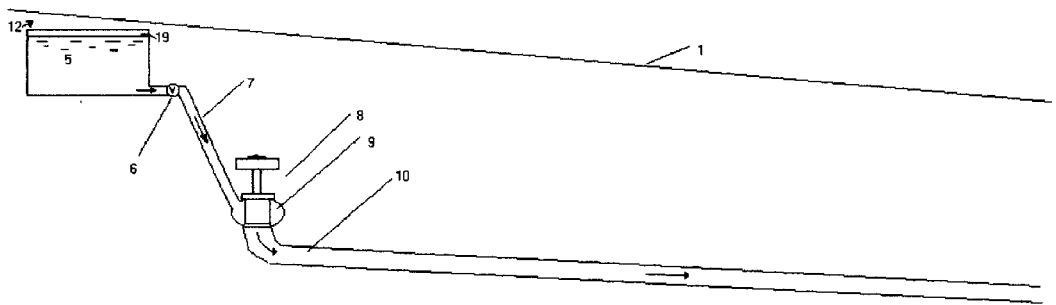
FIG. 1 is a partial cross sectional view of the underground hydroelectric power generating plant. It is meant to show the essence of the invention.

Although specific forms of the invention have been selected for illustration in the drawings, and the following description is drawn in specific terms for the purpose of describing these forms of the invention, this description is not intended to limit the scope of the invention, which is defined in the appended claims.

FIG. 1 generally illustrates an installation of an underground hydroelectric power plant in accordance with the present invention at an installation site 12, which incorporates a water tank 5 adjacent to the river and below ground level. It will be understood that the exemplary site 12 illustrated in the drawings has only been provided for the purposes of generally illustrating an underground hydroelectric power plant in accordance with the present invention, and that the underground hydroelectric power plant of the present invention will find general applicability to other sites incorporating different topographies and/or structural configurations.

Turning first to the composition of the water inlet pipe 3, it will be seen that pipe will have gate/mesh covering 2 at its entrance to prohibit the entrance of any river life, specifically fish which are typically injured in the turbines of hydroelectric plants. It should also be noted that the inlet pipe will intersect the river at such a point that will allow for its optimal operation, which should take into account the depth of the river during the dry season. The diameter of the water inlet pipe 3 should be made to correspond with both the size of the water tank 5 and the number of penstocks 7 built for each individual underground hydroelectric power plant.

Water control valve 4, which immediately follows the water inlet pipe 3, will be controlled by two means, one will use an automated system and the second will be a manual system. The automation system will take info from both the water level sensor 19 in water tank 5 and water level sensor 21, operated by buoy system connected to water inlet pipe 2. Water level sensor 21, will take precedence over water level sensor 19 to ensure that the rivers depth does not get too shallow. The manual system will be used to override the automated system for both emergencies and cleaning of the underground hydroelectric power plant.

Figure 5:
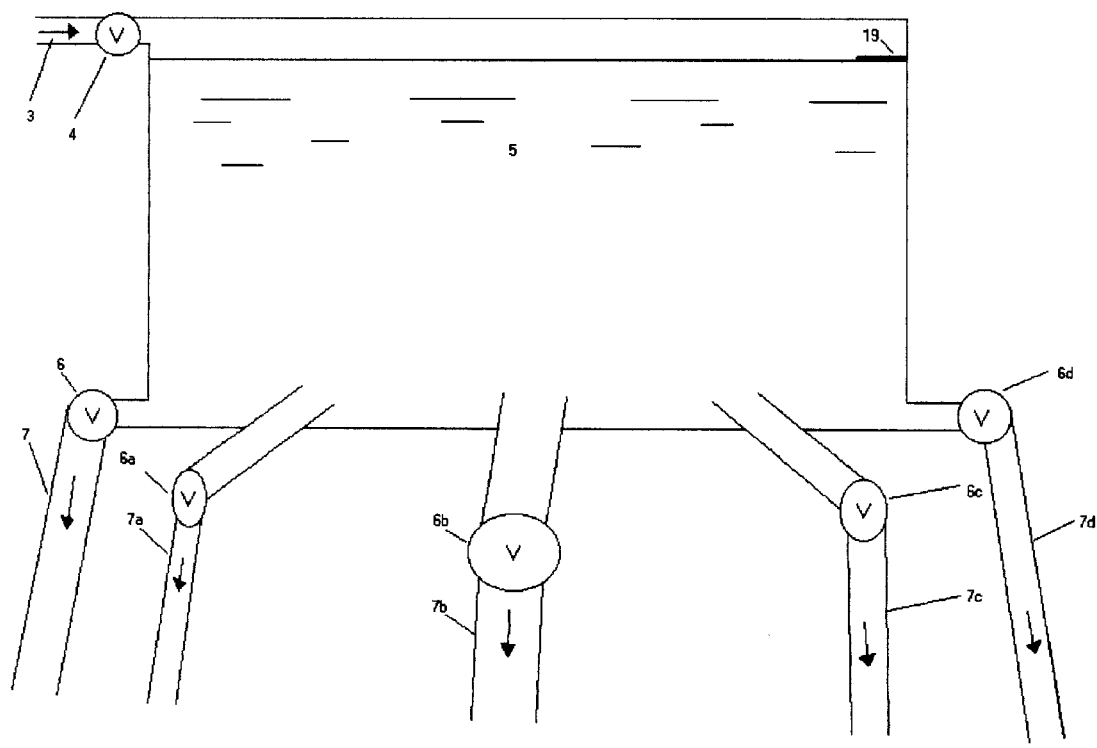
FIG. 5 is a cross sectional view of the water tank and displays the possible use of multiple penstocks that could carry water to multiple turbines.

Following water control valve 4 will be water tank 5, which will be built with respect to water volume flow of the river. Hence, rivers that have large water volume flow larger tanks can be built. Congruently, rivers with smaller water volume flow will incorporate the use of smaller tanks. The water tank 5 will have a cylindrical form to ensure equal pressure on all sides of the tank and should be at least six feet below the nearest point of the ground surface. At the base of water tank will be a penstock 7 or penstocks 7a, 7b, 7c . . . depending on the size of water tank 5. Larger water tanks can incorporate more penstocks, while smaller water tanks will incorporate smaller penstocks. It should be noted that FIG. 5 is not meant to limit the scope of the present invention. Rather it serves as a potential model.

Preceding the penstocks 7 will be water control valves 6 which will be controlled by both an automated system and manual system. The automation system will have two functions. The first function will be to control the flow of water down each individual penstock. The second will be to control the number of water control valves 6 that will be in operation. The automated system will get its info from water level sensor 19. In this way the maximum energy yield of the underground hydroelectric power plant will be optimized for greatest efficiency. The manual system will be put into operation incase of emergency and for cleaning purposes.

Figure 6:
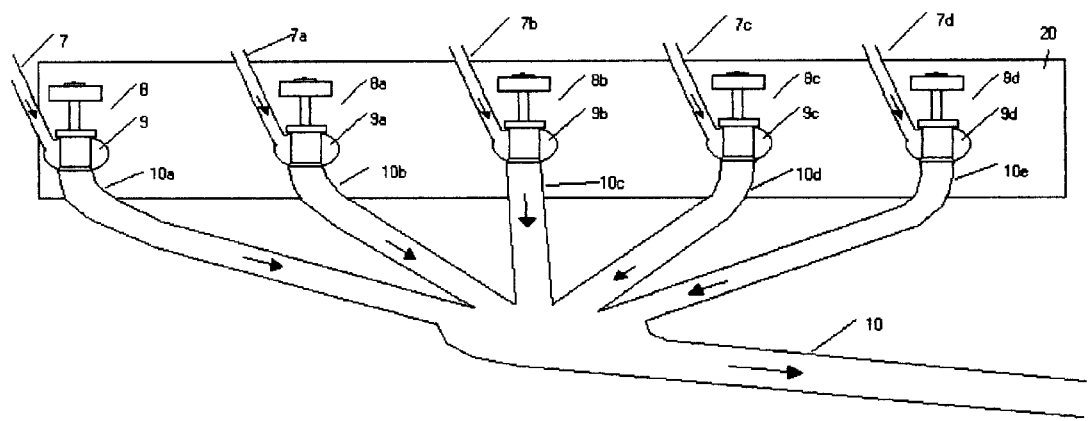
FIG. 6 is a cross sectional view of multiple penstocks leading to multiple turbines, which could power multiple generators. It also displays the drainage of the water system leading to the water outlet.
Figure 7:
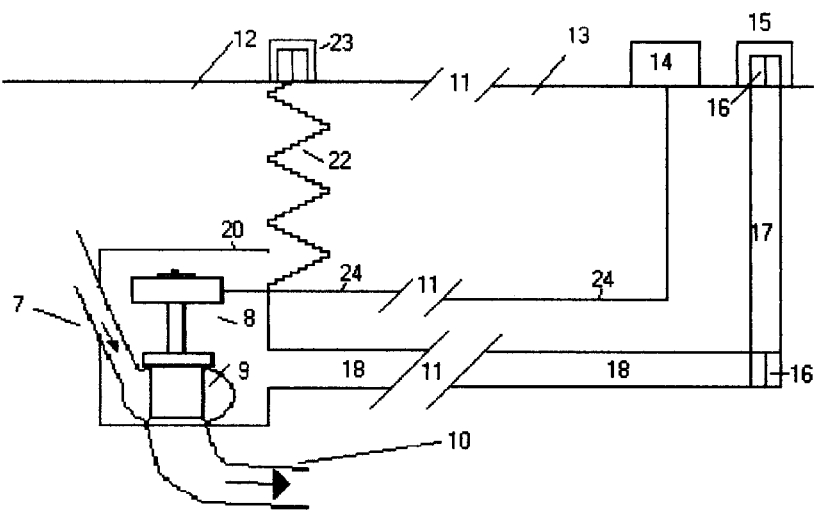
FIG. 7 is a cross sectional view displaying how power cables leading from the generators to the transformers can be placed underground about a mile away from the river.

As shown in FIG. 6 each penstock 7 leads to a turbine 9 which will turn a generator 8 creating electric energy. This electric energy will be taken via underground cables 24 to transformer 14, located on ground 13, where the electric power can be converted to a usable rate. The turbines 9 which will turn the generators 8 will be housed in operation room 20 where they can be serviced when needed. Operation room 20 will also act as the control center for all operations of the underground hydroelectric power plant. As FIG. 7 shows operation room 20 can be accessed via hall 18, which will be a mile long hall. Hall 18 will intersect elevator shaft 17 at the end of its length. Elevator 16 will act as the primary mode of entering and exiting the underground hydroelectric power plant. Elevator 16 will travel between hall 18 and building 15, which will be located on ground 13. Stairway 22 and building 23, located on ground 12, will be utilized as a secondary mode of exiting the facility in case of emergency purposes. It should be noted that space 11 is only meant to symbolize the distance of 1 mile from the underground hydroelectric power plant both building 15 and transformer 14.

Figure 2:
FIG. 2 is a partial cross sectional view of the water outlet for the underground hydroelectric power generating plant, meant to complete FIG. 1.
Figure 3:
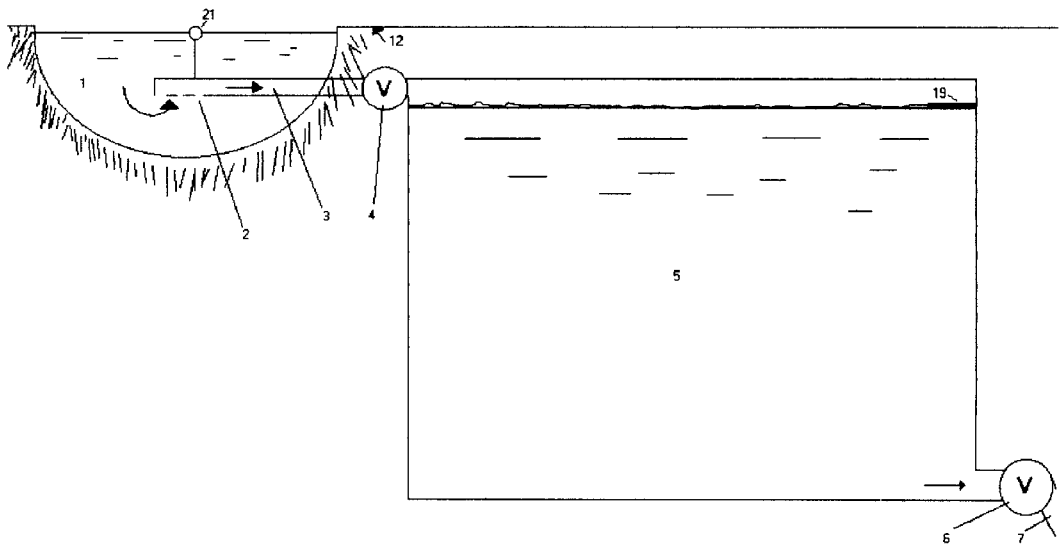
FIG. 3 is a cross section of both the river and water tank.
Figure 4:
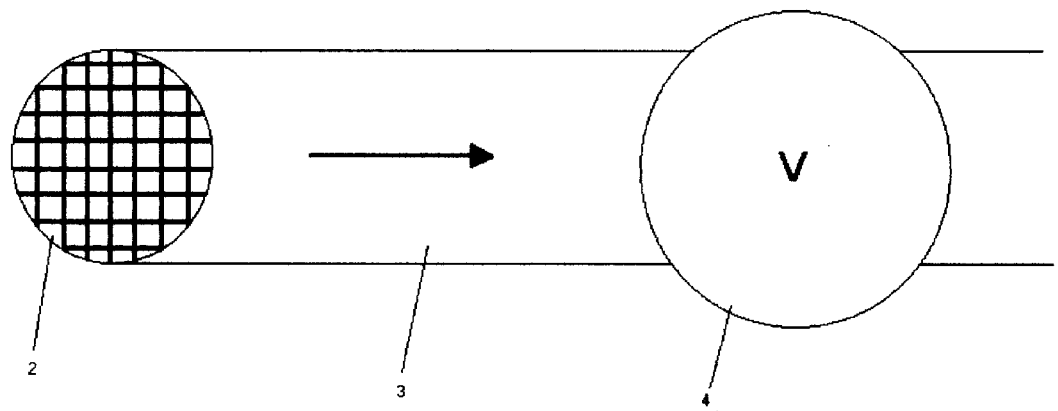
FIG. 4 is a bottom view of the water inlet pipe and water control valve, which lead to the water tank.
Figure 8A:
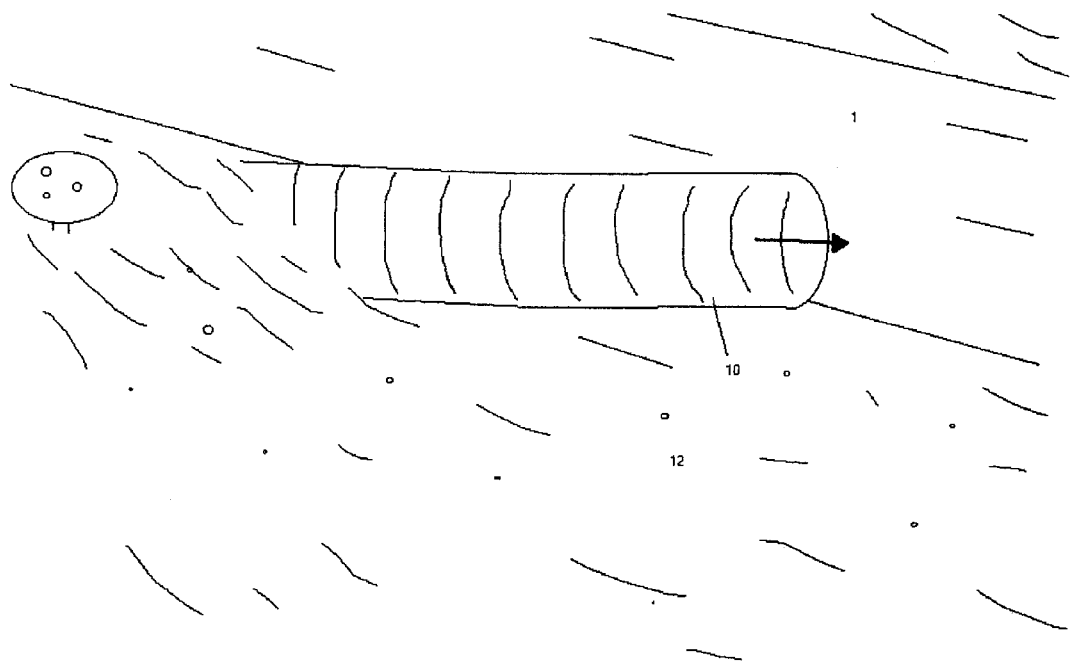
FIG. 8A is partial side-elevational view of the water outlet pipe that would service the underground hydroelectric power generating plant.
Figure 8B:
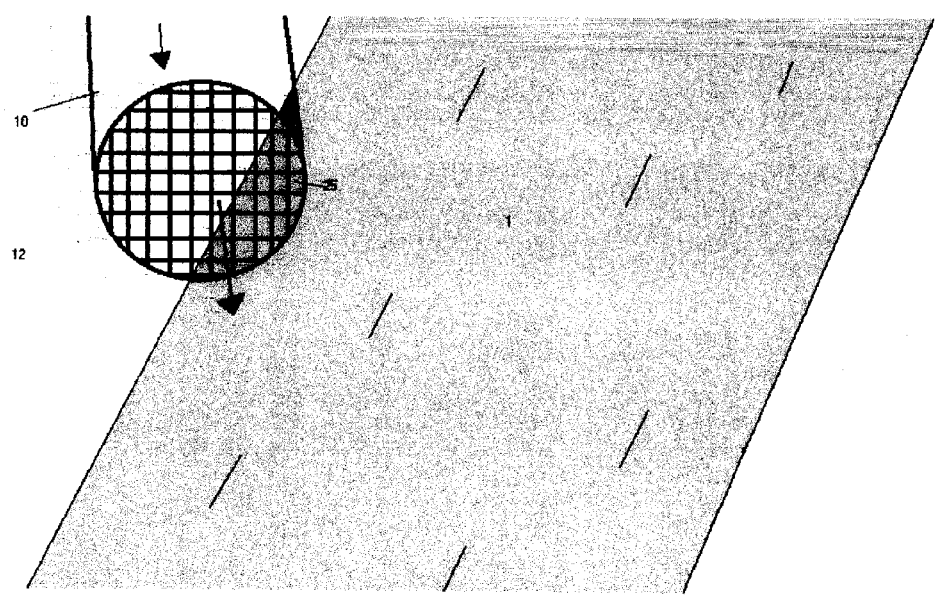
FIG. 8B is a partial side-elevational view of the water outlet pipe that would service the underground hydroelectric power generating plant, meant to complement FIG. 8A.

FIG. 2, FIG. 8A, and FIG. 8B represent the fashion by which water exiting the underground hydroelectric power plant will again intersect the body of water, the river, from which it originated. As seen in FIG. 8B, outlet pipe 10 will partly submersed in the river. Grate 25 is meant to represent a grate/net system, which will inhibit river life, specifically fish, from traveling up outlet pipe 10.

It will therefore be seen that the facility known as the underground hydroelectric power plant meets the objectives as stated in the summary of the invention. It will also be understood that the forgoing facility is capable of variation without departing from the spirit and scope of the present invention.

What I claim as my invention is:

1. An apparatus for generating hydroelectric power for use adjacent to rivers comprising of:

(a) a water inlet pipe, with a gate/mesh covering, bisecting the river;
    (b) a water level sensor, operated by a buoy system, connected to the water inlet pipe;
    (c) a multi-controlled water valve at the end of the water inlet pipe;
    (d) an underground water tank that contains a water level sensor, and a plurality of penstocks at its base;
    (e) a multi-controlled water valve for each said penstock;
    (f) penstocks leading to turbines, each operably connected to a generator;
    (g) a turbine-generator system to produce electrical energy;
    (h) an operation room where the said turbines and generators will operate, where water flow through the apparatus will be controlled, and where technicians will both enter and exit the facility during both regular and emergency operating times;

(i) an underground hallway connected to an elevator shaft to transport technicians both in and out of the facility;

(j) an emergency stairway above the operation room;

(k) underground cable lines from the generators leading to above ground transformers located adjacent to an elevator shaft's above ground entrance;

(l) a water outlet pipe connected to each said turbine leading to back to the river;

(m) and a gate/mesh covering for the end of the water outlet pipe.

2. An apparatus for generating hydroelectric power as set forth in claim 1 that can be put in series down a river so that incrementally additional sections of the river can be utilized.

3. An apparatus for generating hydroelectric power as set forth in claim 1 that will inhibit trash and other clogging factors from stopping operation of said apparatus.

4. An apparatus for generating hydroelectric power as set forth in claim 1 that will permit the utilization of rivers that freeze-over in the cold season.

* * * * *